United States Patent
Lin et al.

(10) Patent No.: US 10,437,710 B2
(45) Date of Patent: Oct. 8, 2019

(54) CODE COVERAGE TESTING UTILIZING TEST-TO-FILE MAPS

(71) Applicant: ENTIT Software LLC, Sunnyvale, CA (US)

(72) Inventors: Sharon Lin, Yehud (IL); Adi Godkin, Yehud (IL); Elad Avraham, Yehud (IL); Elad Azulay, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/786,353

(22) Filed: Oct. 17, 2017

(65) Prior Publication Data

US 2019/0114252 A1  Apr. 18, 2019

(51) Int. Cl.
G06F 11/36 (2006.01)
G06F 9/44 (2018.01)

(52) U.S. Cl.
CPC ............ *G06F 11/3676* (2013.01); *G06F 9/44* (2013.01); *G06F 11/3664* (2013.01); *G06F 11/3668* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 7,797,680 B2* | 9/2010 | Haas | G06F 11/3688 714/38.1 |
| 9,032,373 B1 | 5/2015 | Gupta et al. | |
| 9,442,830 B1* | 9/2016 | Zhang | G06F 11/3688 |
| 9,652,509 B2 | 5/2017 | Shani et al. | |
| 9,684,507 B2* | 6/2017 | Mallisetty | G06F 8/71 |
| 9,703,677 B2* | 7/2017 | Meerovich | G06F 11/3676 |
| 2009/0265694 A1 | 10/2009 | Bakowski | |
| 2016/0085663 A1* | 3/2016 | Best | G06F 11/3692 714/38.1 |
| 2017/0262361 A1* | 9/2017 | Francis | G06F 11/3688 |

OTHER PUBLICATIONS

Code Coverage of Individual Tests with SonarQube and JaCoCo; DEORS—dr. macphail's trance Jul. 4, 2014.
Configuring Test Coverage; Code Climate accessed Aug. 21, 2017.
Continuous Integration and Deployment Modem Technique's; Vivek Verma et al. JCSE Open Access, Intl Journal od Computer Sciences and Engineering E-ISSN: 2347-2693 vol. 4 Iss. 4 Apr. 30, 2016.
Continuous Integration and Test; Vector Software accessed Aug. 21, 2017.
Test Automation Strategies in a Continuous Delivery Ecosystem; Sriram Sitaraman et al. Cognizant 20-20 Insights Oct. 2016.

* cited by examiner

*Primary Examiner* — Francisco J Aponte
*Assistant Examiner* — Mark A Gooray

(57) ABSTRACT

In some examples, a method may include receiving, by a system comprising a processor, for a first invocation of a first test of a plurality of code coverage tests run at overlapping times, a first report indicating a first subset of files of application code covered by the first test. The method may include generating, by the system, a test-to-file map associating the first subset of files to the first test. The method may include receiving, by the system, a second report indicating a second subset of files of the application code covered by a second invocation of the first test. The method may include modifying, by the system, the test-to-file map to associate the second subset of files to the first test.

18 Claims, 7 Drawing Sheets

CODE COVERAGE TESTING UTILIZING TEST-TO-FILE MAPS

BACKGROUND

Software applications may be tested before release to ensure quality and functionality.

BRIEF DESCRIPTION OF THE DRAWINGS

Some implementations of the present disclosure are described with respect to the following figures.

Figure 1:
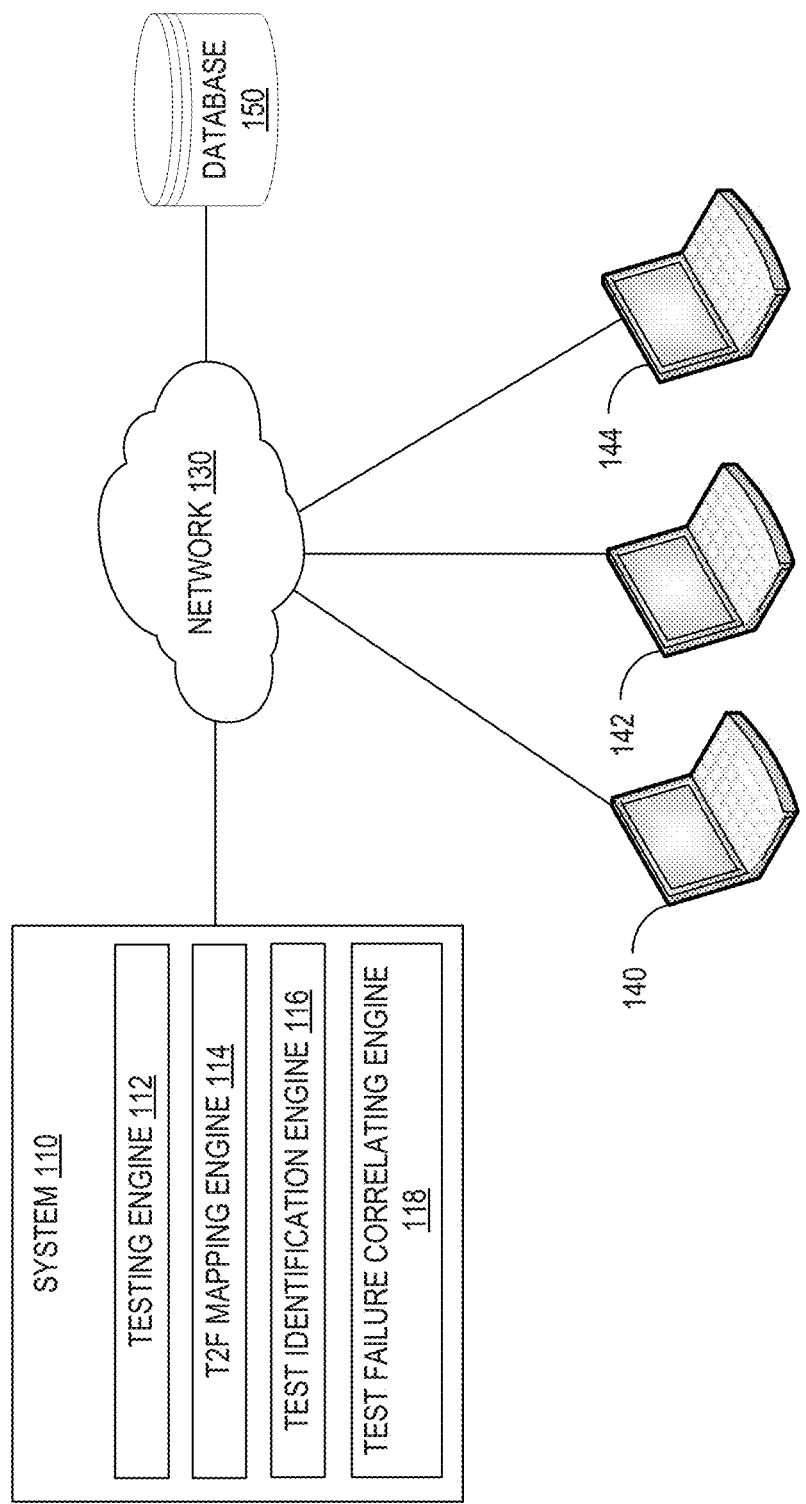
FIG. 1 is a block diagram of an arrangement that includes devices coupled over a network, and an application testing, mapping, identification and/or test failure correlating system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description; however, the description is not limited to the examples provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements. Moreover, use of the terms "first", "second", etc. does not necessarily indicate a temporal ordering or other ordering, but rather provides labels for identifying different tests, invocations, subsets, reports, etc.

Software applications are becoming increasingly sophisticated and complicated, sometimes being developed by multiple developers, multiple times, and in multiple code files that are continuously updated. In order to bring such software applications to market in reasonable amounts of time, and to ensure ongoing quality and functionality, these applications may be developed and maintained through a "continuous integration" (CI) process. In the CI process, additional or modified application code may be automatically tested to ensure continued quality and functionality, and based on the tests, a report may be generated that identifies which portions or files of the application code were covered by a particular test. In this way, developers may be able to determine whether a particular addition or modification to application code will result in a properly-functioning application, and also determine the portions of the code that were tested.

Because multiple additions and/or modifications to a particular application may be committed (e.g. submitted) by the same developer or by multiple developers, modern parallel CI systems may perform multiple code coverage tests on the same application under test at overlapping times, e.g., performing multiple tests on the same application in parallel. Thus, it may be useful to assess accurately what portions of the application code are covered by a particular test in order to ensure ongoing quality and functionality. It may also be useful to optimize testing such that tests known or determinable to cover a particular portion of modified code are run subsequent to submission of the modified or added application code. It may be further useful to detect which developer is responsible for modified or added application code that caused a specific test failure, as such knowledge may allow more-efficient debugging and/or isolation of the offending code in a time and/or resource-efficient manner.

In accordance with some examples, an incremental learning-based approach may be used to perform analysis of code coverage for individual tests based on potentially inaccurate coverage reports to generate, update and maintain an accurate mapping between particular tests and application code files that are covered by those particular tests.

In accordance with some examples, the above incremental learning-based approach may be further extended to test optimization, where a subset of tests is provided based on which files have been modified by performing a correlation between the modified files and the code coverage of individual tests.

In accordance with some examples, the above incremental learning-based approach may be further extended, in the event of test failure, to detect which developer is responsible for modified or added application code that caused a specific test failure.

FIG. 1 is a block diagram of an arrangement including devices 140, 142, 144, database 150, and an application testing system 110 coupled over a network 130, according to some examples.

Database 150 may be configured to store at least one software application, which may be subjected to multiple tests for quality and functionality by system 110. In some examples, database 150 may be further configured to store one or more test-to-file maps to determine code coverage of each of the multiple tests for quality and functionality, as will be described in more detail below. Although a single database is illustrated, the present disclosure also contemplates multiple databases configured to store all or a portion of the software application, and/or multiple databases configured to store all or a portion of a test-to-file map.

Network 130 can include a wired network, a wireless network, or a combination of wired and wireless networks. Moreover, in some examples, network 130 (or a portion of network 130) may comprise an enterprise network, such as an intranet, accessible by users of an enterprise (e.g., a company, a government agency, an educational organization, etc.). In some examples, network 130 (or a portion of network 130) may be a public network, such as the Internet.

Devices 140, 142 and 144 may be configured to retrieve the software application from database 150 and to submit (e.g., commit) one or more modifications or additions to the code of the software application, or new code of a new application, provided by developers at devices 140, 142, 144, to database 150 via network 130. Devices 140, 142 and 144 may include any or some combination of the following: a desktop computer, a notebook computer, a tablet computer, a smartphone, a server computer, or any other device capable of communicating over network 130. Although three devices 140, 142 and 144 are shown, the present disclosure contemplates more or fewer such devices.

System 110 may include a testing engine 122 configured to retrieve the software application from database 150, perform multiple tests in series or parallel against the software application, and output individual coverage reports of each of the multiple tests. An example of testing engine 122 may include an implementation of the JUnit listener, which tracks invocations of certain events (e.g., test starts, finishes, failures or skips) of each test run, and performs operations based on invocations of those events while automation code of testing engine 122 is running, for example, tracking and incrementing respective counters associated with each test run. Such a JUnit listener of testing engine 122 may interact with a JaCoCo agent, which is a Java agent that uses class file instrumentation to record execution coverage data in real time, generate a code coverage report for each test run, and for example, reset the counters of the JUnit listener between tests. Where such tests are run in parallel, the generated code coverage reports are, at times, at least partially inaccurate, as will be described in more detail in connection with FIG. 2.

System 110 may further include a test-to-file (T2F) mapping engine 114 configured to generate and modify (e.g., update) a test-to-file map that associates specific files of the software application with the particular, individual test based on the code coverage reports generated and provided by testing engine 122, thereby rectifying many if not all inaccuracies of the code coverage reports through incremental learning techniques, as will be described in more detail in connection with FIGS. 2-9.

Figure 7:
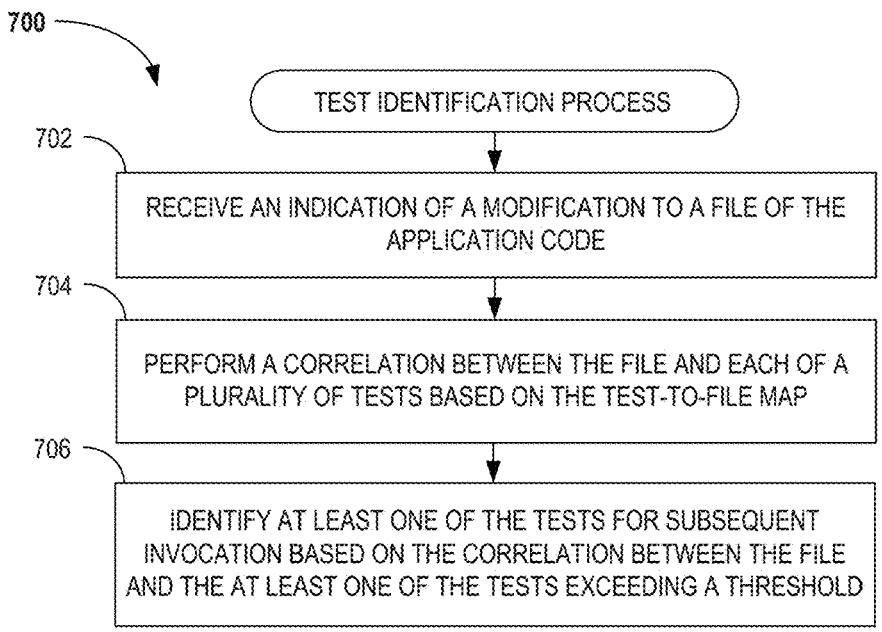
FIG. 7 is a flow diagram of a process of identifying a test for a submitted code modification, according to some examples.

System 110 may further include a test identification engine 116 configured to perform a correlation between a modified file of the software application and files mapped to each of a plurality of tests, based on the test-to-file map from test-to-file mapping engine 114, and to identify at least one of the tests for subsequent invocation based on the correlation between the modified file and the files mapped to at least one of the tests exceeding a threshold, as will be described in more detail in connection with FIG. 7.

System 110 may further include a test failure correlating engine 118 configured to perform a correlation between occurrence of each of a plurality of modifications to the software application code and a particular test failure, and to select a modification having a highest correlation of the plurality of modifications as a cause of the failure, as will be described in more detail in connection with FIG. 6.

As used here, an "engine" can refer to a memory comprising non-transitory machine-readable instructions and a hardware processing circuit that carries such instructions out. Such a hardware processing circuit can include but is not limited to any or some combination of the following: a microprocessor, a core of a multi-core microprocessor, a microcontroller, a programmable gate array, a programmable integrated circuit device, or any other hardware processing circuit.

Figure 2:
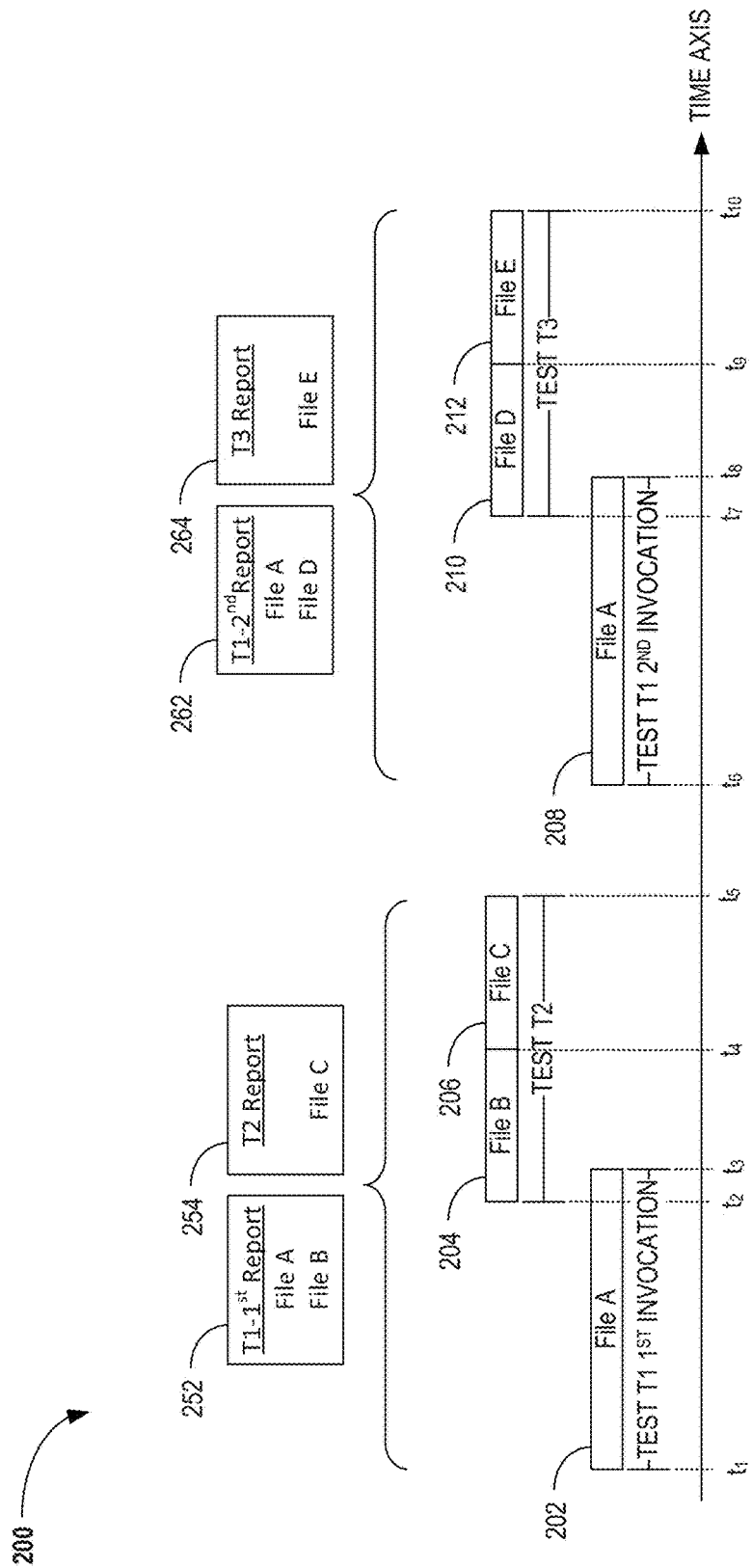
FIG. 2 is a diagram illustrating a plurality of code coverage tests running at overlapping times on an application under test, according to some examples.

FIG. 2 is a diagram 200 illustrating a plurality of code coverage tests T1 1$^{st}$ invocation, T2, T1 2$^{nd}$ invocation, and T3 running at overlapping times on an application under test, according to some examples. Such code coverage tests may test the integrity of one or more executable functions that cover, or call, one or more files comprising code of the application under test. Although only two tests are shown as being performed during the same overlapping timeframe, the present disclosure contemplates any number of parallel performed tests, e.g., hundreds or even thousands of parallel performed tests. As shown in FIG. 2, testing engine 112 runs a first invocation of a first test T1, which covers "File A" 202 comprising code of the application under test, starting at $t_1$ and finishing at $t_3$. Thus, testing engine 112 records "File A" 202 as being covered by test T1. Although FIG. 2 illustrates that the first invocation of the test T1 runs while the code within "File A" 202 is being accessed, run or tested, the test T1 does not necessarily extend only for the duration in which a single file (e.g., "File A" 202) is accessed, run or tested. Rather, in this example, the function or functions tested by the test T1 just happen to only cover "File A" 202.

While the first invocation of the first test T1 is still running, a second test T2 is run in parallel with the first invocation of T1. Second test T2 covers "File B" 204, comprising code of the application under test, starting at $t_2$ and finishing at $t_4$, and "File C" 206, comprising code of the application under test, starting at $t_4$ and finishing at $t_5$. Thus, Test T2 runs from $t_2$ to $t_5$.

However, because the JUnit Listener and the JaCoCo agent of testing engine 112 are designed to monitor non-overlapping tests, e.g., tests run in series rather than tests run in parallel, any file in the execution path of T2 while T1 is still running (e.g., "File B") will also be incorrectly associated with T1. Thus, testing engine 112 also inaccurately records "File B" 204 as being covered by test T1.

Moreover, because the JUnit Listener and the JaCoCo agent of testing engine 112 are designed to monitor non-overlapping tests, e.g., sequential testing rather than parallel testing, when test T1 is completed at $t_3$, testing engine 112 generates a coverage report 252 for test T1 including "File A" 202 and "File B" 204 and then resets the coverage reports for all tests currently running at $t_3$. This reset will cause "File B" 204 not to appear on the code coverage report for test T2 because the indication of coverage of "File B" 204 for test T2 was reset, at $t_3$, before the conclusion of the test T2, at $t_5$. Thus, upon completion of test T2 at $t_5$, testing engine 112 will generate a code coverage report 254 for test T2 including only "File C" 206. Thus, due to the temporal overlap of the test T1 and the test T2, the code coverage report for the first invocation of T1 will be inaccurate (i.e., inappropriately include "File B" 204), and the code coverage report for T2 will be incomplete (i.e., missing "File B" 204).

FIG. 2 further illustrates how running two invocations of the same test can result in different files being reported as covered by each invocation as a result of other tests running other files in parallel. For example, a second invocation of the first test T1, which covers "File A" 202, is started at $t_6$ and finished at $t_8$. Test T3 covers "File D" 210, comprising code of the application under test, starting at $t_7$ and finishing at $t_9$, and File E", comprising code of the application under test, starting at $t_9$ and finishing at $t_{10}$. Thus, test T3, which runs from $t_7$ to $t_{10}$, is started at $t_7$, before the completion of the second invocation of the first test T1 at $t_8$, and is finished at $t_{10}$, after the completion of the second invocation of the first test T1 at $t_8$. Accordingly, at the completion of the second invocation of the first test T1 at $t_8$, testing engine 112 will generate a code coverage report 262 for T1 that includes "File A" 202, which is covered by the second invocation of the test T1, and "File D" 210 which is not covered by the second invocation of the test T1, but is running concurrently for the test T3. Testing engine 112 then resets the coverage reports for all tests currently running at $t_8$. This reset will cause "File D" 210 not to appear on the code coverage report for test T3 because the indication of coverage of "File D" 210 for the test T3 was reset, at $t_8$, before the conclusion of the test T3, at $t_{10}$. Thus, upon completion of test T3 at $t_{10}$, testing engine 112 will generate a code coverage report 264 for test T3 including only "File E" 212. Thus, due to the temporal overlap of the second invocation of test T1 and the test T3, the code coverage report 262 for the second invocation of T1 will be inaccurate (i.e., inappropriately include "File D" 210), and the code coverage report 264 for T3 will be incomplete (i.e., missing "File D" 210).

In this way, files reported as covered in a code coverage report may depend not only on the files covered by the test, but also on the files concurrently running in any parallel test. Example processes for refining such inaccurate code coverage reports using generation and modification of test-to-file maps and incremental learning is described in more detail below.

Figure 3:
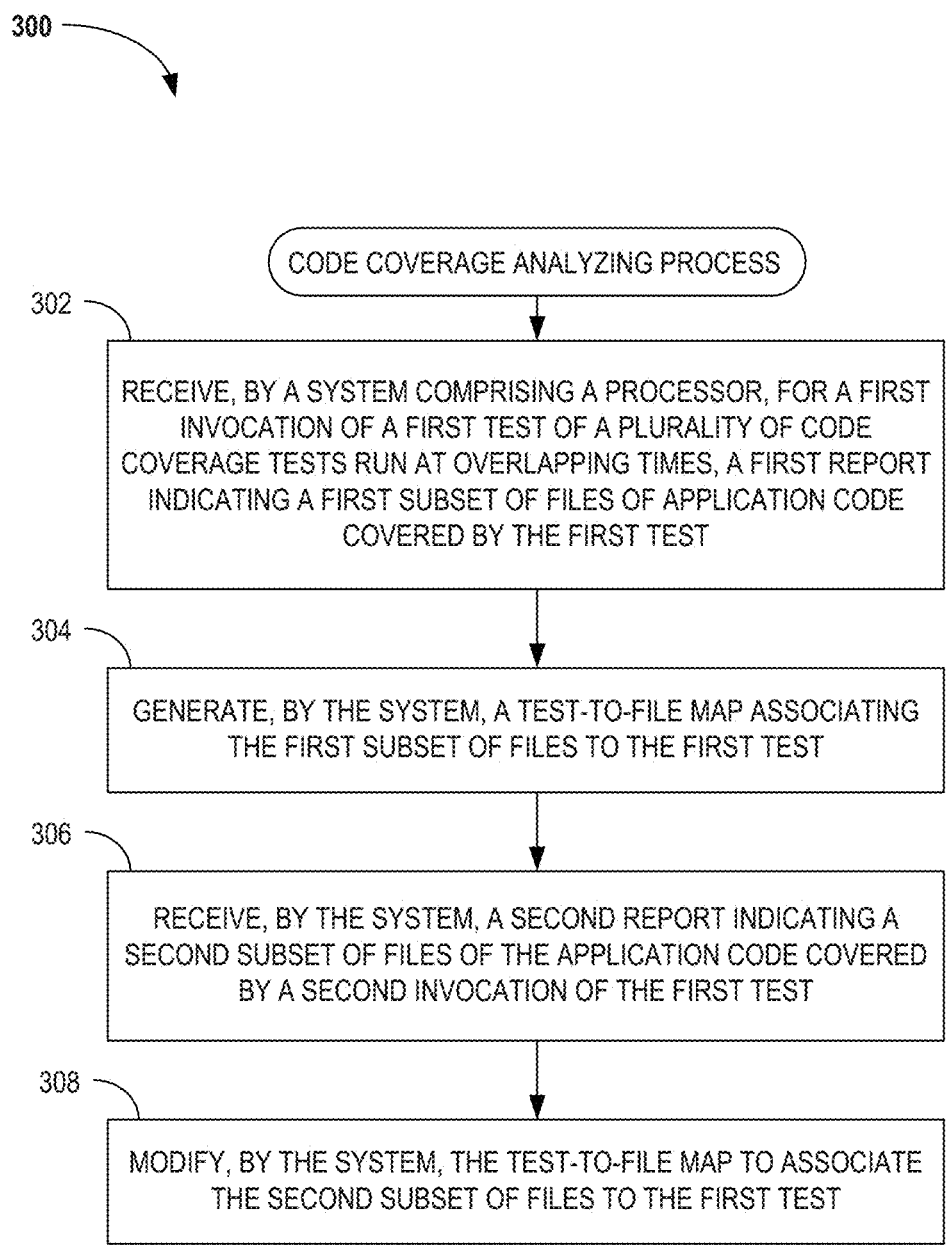
FIG. 3 is a flow diagram of a code coverage analyzing process, according to some examples.

FIG. 3 is a flow diagram 300 of a code coverage analyzing process, according to some examples. Flow diagram 300 may be carried out, for example, by T2F mapping engine 114 of FIG. 1. It should be understood that not all blocks of flow diagram 300 may be carried out and, in some examples, one or more actions not described in connection with flow diagram 300 may be carried out.

Flow diagram 300 begins with block 302, which includes receiving, by a system comprising a processor, for a first invocation of a first test of a plurality of code coverage tests run at overlapping times, a first report indicating a first subset of files of application code covered by the first test. For example, as previously described in connection with FIGS. 1 and 2, T2F mapping engine 114 of system 110 may receive code coverage report 252 shown in FIG. 2 from testing engine 112 indicating "File A" 202 and "File B" 204 as covered by the test T1. In some examples, "overlapping times" may be understood to mean partially overlapping times or completely overlapping times.

Flow diagram 300 advances to block 304, which includes generating, by the system, a test-to-file map associating the first subset of files to the first test. For example, as will be described in more detail in connection with FIG. 4 below, with respect to FIGS. 1 and 2, T2F mapping engine 114 of system 110 may generate a test-to-file (T2F) map associating "File A" 202 and "File B" 204 with the test T1.

Flow diagram 300 advances to block 306, which includes receiving, by the system, a second report indicating a second subset of files of the application code covered by a second invocation of the first test. For example, as previously described in connection with FIGS. 1 and 2, T2F mapping engine 114 of system 110 may receive code coverage report 262 shown in FIG. 2 from testing engine 112 indicating "File A" 202 and "File D" 210 as covered by the test T1.

Flow diagram 300 advances to block 308, which includes modifying, by the system, the T2F map to associate the second subset of files to the first test. For example, as will be described in more detail in connection with FIG. 4 below, with respect to FIGS. 1 and 2, T2F mapping engine 114 may modify the T2F map generated at block 304 by further associating "File A" 202 and "File D" 210 with the test T1.

In this way, T2F mapping engine 114 continues to update and refine the T2F map for the test T1, including files indicated as being covered by the test T1 in a growing number of code coverage reports. A similar process may also be utilized to generate, modify and refine T2F maps for each test (e.g., tests T2 and T3) performed by testing engine 112.

Figure 4:
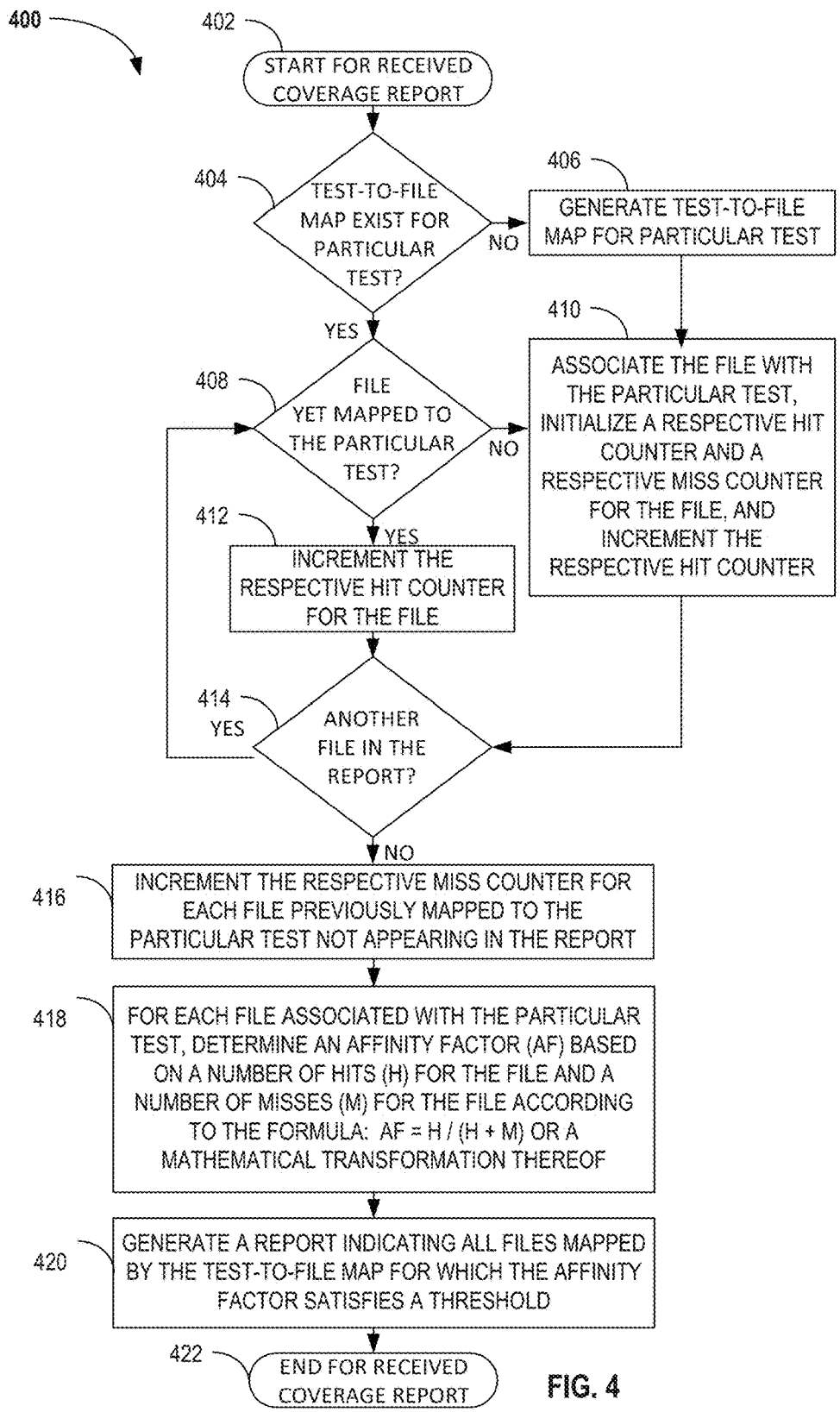
FIG. 4 is a flow diagram of generating and updating a test-to-file map, according to some examples.

As described in connection with FIG. 2, the code coverage reports, and thus the T2F maps generated and updated based thereon, may be subject to inaccuracies. FIG. 4 illustrates generating and updating a T2F map in a way that reduces the effect of such inaccuracies, according to some examples. Flow diagram 400 may be carried out, for example, by T2F mapping engine 114 of FIG. 1. It should be understood that not all blocks of flow diagram 400 may be carried out and, in some examples, one or more actions not described in connection with flow diagram 400 may be carried out. For the purpose of at least FIG. 4, a report is considered to include files of an application under test covered by or associated with a single test. Where a report includes files of an application under test covered by or associated with more than one test, the report may be parsed and files of the application under test covered by or associated with each single test reported may be utilized concurrently or in turn.

Flow diagram 400 begins at start block 402 and advances to block 404, which includes determining whether a T2F map exists for the particular test for which a report has been received, for example, the test T1. If it is determined that a T2F map does not exist for the particular test at block 404, flow diagram 400 advances from block 404 to block 406, which includes generating a T2F map for the particular test. For example, T2F mapping engine 114 may generate a new T2F map for the first test T1 the first time it receives a coverage report for the first test T1, for example coverage report 252. The new T2F map may be stored locally in system 110 or remotely, for example in database 150.

Flow diagram 400 then advances from block 406 to block 410, which includes associating the file with the particular test, initializing a respective hit counter and a respective miss counter for the file, and incrementing the respective hit counter. For example, upon generation of the T2F map for the first test T1 in response to receipt of report 252, T2F mapping engine 114 may associate the first file "File A" 202 with the first test T1 by, for example, generating an identifier of "File A" 202 within the T2F map, initialize a respective hit counter and a respective miss counter for the first file "File A" 202 and increment the respective hit counter. Flow diagram 400 then advances to block 414.

Turning back to block 404, if T2F mapping engine 114 determines that a T2F map exists for the particular test at block 404, flow diagram 400 advances from block 404 to block 408, which includes determining whether the first file in the received report has previously been mapped to the particular test. For example, referring to FIG. 2, upon receipt of coverage report 262, a T2F map for the test T1 would have already been generated based on receipt of coverage report 252. Thus, T2F mapping engine 114 would determine whether the first file in coverage report 262, "File A", had already been mapped to the first test T1.

If T2F mapping engine 114 determines that the first file in the received report has not previously been mapped to the particular test at block 408, flow diagram 400 advances from block 408 to block 410, where a respective hit counter and a respective miss counter for the file is initialized and the respective hit counter for that file is incremented. Flow diagram 400 then advances to block 414.

If T2F mapping engine 114 determines that the first file in the received report has previously been mapped to the particular test at block 408, flow diagram 400 advances from block 408 to block 412, which includes incrementing the respective hit counter for the file. For example, upon receipt of coverage report 262, since T2F mapping engine 114 would have already mapped "File A" 202 to the first test T1 based on receipt and mapping of coverage report 252, T2F mapping engine 114 would increment the respective hit counter for "File A". Flow diagram then advances to block 414.

At block 414 a determination is made whether there is another file indicated in the coverage report. If T2F mapping engine 114 determines there is another file indicated in the coverage report at block 414, flow diagram 400 advances back to block 408 and the process reiterates for each file in the report. For example, in connection with FIGS. 1 and 2, for either coverage report 252 or 262, after mapping "File A", T2F mapping engine 114 may circle back and map "File B" 204 or "File D" 210, respectively.

If T2F mapping engine 114 determines there is not another file indicated in the coverage report at block 414, flow diagram 400 advances from block 414 to block 416, which includes incrementing the respective miss counter for each file previously mapped to the particular test not appearing in the report. For example, in connection with FIGS. 1 and 2, after incrementing the respective hit counter for "File D" 210 based on report 262, T2F mapping engine would increment the respective miss counter for "File B", which is the only file previously mapped to the first test T1 not appearing in report 262.

Flow diagram 400 then advances to block 418, which includes, for each respective file associated with the particular test, determining an affinity factor (AF) based on a number of hits (H) for the respective file and a number of misses (M) for the respective file. In some examples, the affinity factor may be determined according to the formula: $AF=H/(H+M)$. In other examples, the affinity factor may include calculation of $H/(H+M)$, plus additional mathematical operations (e.g. linear transformations) performed on $H/(H+M)$. For example, after processing report 252, T2F mapping engine 114 may calculate the AF of both files "File A" 202 and "File B" 204. Although the affinity factor may be calculated according to the above formula, the affinity factor may also be calculated according to formulae including other operations and/or elements.

Flow diagram 400 then advances to block 420, which includes generating a report indicating all files mapped by the T2F map for which the affinity factor satisfies a threshold. Based on the AF formula above, such a threshold may be any value between 0 and 1 determined to provide an increased reliability that a file having an AF exceeding the threshold is covered by the particular test, for example, greater than, or greater than or equal to, 0.25, 0.5 or 0.75. In the alternative, T2F mapping engine 114 may generate the report indicating all files mapped by the T2F map, further indicating the current AF of each file.

Flow diagram 400 then advances to end block 422. The process of flow diagram 400 may be repeated for each received report that is to be used to update the T2F map for a particular test.

A short step through of flow diagram 400 of FIG. 4 with respect to FIG. 2 and the reports 252 and 262 follows as an example and for ease of understanding. At 402, T2F mapping engine 114 receives report 252 indicating "File A" 202 and "File B" 204 are covered by test T1. At 404, T2F mapping engine 114 determines a T2F map does not yet exist for the test T1. At 406, T2F mapping engine 114 generates a T2F map for the test T1. At 410, T2F mapping engine 114 associates "File A" 202 with the test T1 by, for example, generating an identifier of "File A" 202 within the T2F map for the test T1, initializes a respective hit counter and a respective miss counter for "File A" 202, and increments the respective hit counter. "File A" is now associated with hit counter=1, miss counter=0. At 414, T2F mapping engine 114 determines that there is another file indicated in report 252 ("File B"). At 408, T2F mapping engine 114 determines that "File B" 204 has not yet been mapped to the test T1. At 410, T2F mapping engine 114 initializes a respective hit counter and a respective miss counter for "File B" 204 and increments the respective hit counter. "File B" 204 is now associated with hit counter=1, miss counter=0. At 414, T2F mapping engine 114 determines there is not another file in the report. No files were previously mapped to the T2F map for the test T1 as it was just generated in response to receipt of report 252. Thus, no miss counters are incremented at 416. At 418, T2F mapping engine 114 determines, for each of "File A" 202 and "File B" 204, an affinity factor. Hit counter=1 and miss counter=0 for each of "File A" 202 and "File B" 204. Thus, AF=1.0 for each of "File A" 202 and "File B" 204. At 420, T2F mapping engine 114 generates a modified coverage report indicating both "File A" 202 and "File B" 204 as having an AF satisfying a threshold, for example, greater than or equal to 0.5. The above process may be repeated for receipt of report 254 for the test T2 as described in FIG. 4 above.

T2F mapping engine 114 then receives report 262 indicating "File A" 202 and "File D" 210 are covered by test T1. At 404, T2F mapping engine 114 determines a T2F map does exist for the test T1. At 408, T2F mapping engine 114 determines that the first file "File A" 202 has already been mapped to the test T1. At 412, T2F mapping engine 114 increments the respective hit counter for "File A". Thus, "File A" is associated with hit counter=2, miss counter=0. At 414, T2F mapping engine 114 determines that there is another file indicated in report 262 ("File D"). At 408, T2F mapping engine 114 determines that "File D" 210 has not yet been mapped to the test T1. At 410, T2F mapping engine 114 initializes a respective hit counter and a respective miss counter for "File D" 210 and increments the respective hit counter. Thus, "File D" 210 is now associated with hit counter=1, miss counter=0. At 414, T2F mapping engine 114 determines there is not another file in the report. At 416, T2F mapping engine 114 increments the respective miss counter for "File B" 204, which was mapped in the T2F map for the test T1 based on receipt of report 252 and does not appear in report 262. Thus, "File B" 204 is now associated with hit counter=1, miss counter=1. At 418, T2F mapping engine 114 determines, for each of "File A" 202 and "File B", an affinity factor. Thus, "File A", which is associated with hit counter=2, miss counter=0, has an AF=1.0, "File B", which is associated with hit counter=1, miss counter=1, has an AF=0.5, and "File D", which is associated with hit counter=1, miss counter=0, has an AF=1.0. At 420, T2F mapping engine 114 generates a modified coverage report indicating "File A", "File B" 204 and "File D" 210 as having an AF satisfying a threshold, for example, greater than or equal to 0.5. Where the threshold is chosen to be a number "less than 0.5" or "greater than 0.5", "File B" 204 would not appear on the modified coverage report. The above process may be repeated for receipt of report 264 for the test T3 as described in FIG. 4 above. By utilizing the affinity factor to identify files of the application code under test that are covered by a particular test, code coverage may be more accurate over the course of time as more and more iterations are utilized to further refine the AF through receipt of multiple code coverage reports for the particular test.

Figure 5:
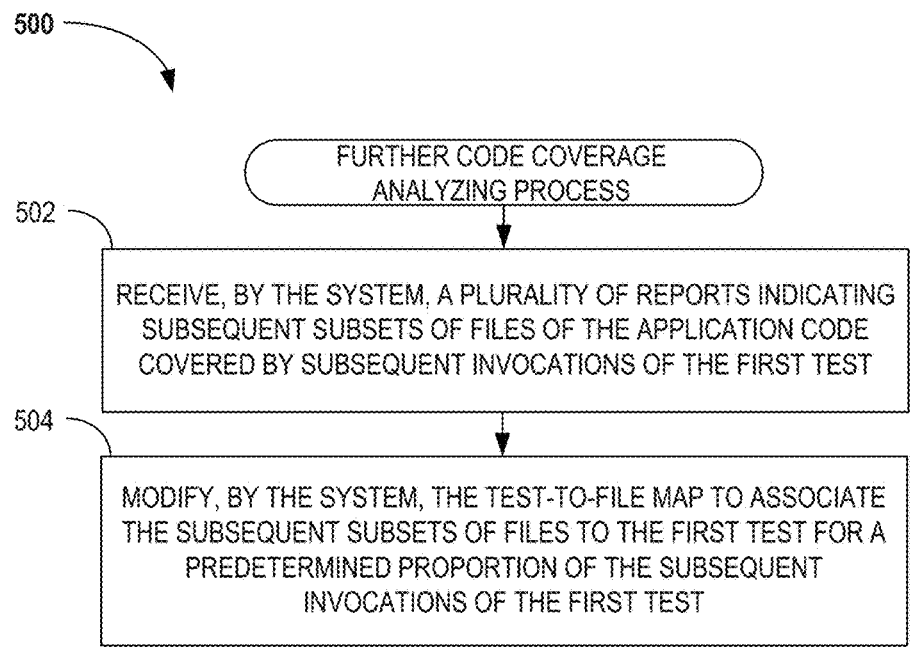
FIG. 5 is a flow diagram of a further code coverage analyzing process, according to some examples.

FIG. 5 is a flow diagram 500 of a further code coverage analyzing process, according to some examples. For example, T2F mapping engine 114 may carry out flow diagram 500, in some examples, after carrying out flow diagram 400 of FIG. 4. It should be understood that not all blocks of flow diagram 500 may be carried out and, in some examples, one or more actions not described in connection with flow diagram 500 may be carried out.

Flow diagram 500 begins with block 502, which includes receiving, by the system, a plurality of reports indicating subsequent subsets of files of the application code covered by subsequent invocations of the first test. For example, T2F mapping engine 114 of system 110 may receive several additional code coverage reports for subsequent invocations of the first test T1 after having received code coverage report 262.

Flow diagram 500 advances to block 504, which includes modifying, by the system, the T2F map to associate the subsequent subsets of files to the first test for a predetermined proportion of the subsequent invocations of the first test. For example, T2F mapping engine 114 may determine, in some examples at random, that a predetermined percentage (e.g., 1 in X, where X is some number greater than or equal to 1) of the subsequent coverage reports for a particular test are to be used to modify and update the T2F map for that test. In some other examples, T2F mapping engine 114 may select the subsequent invocations of the first test to be associated with the first test based on the subsequent subsets of files indicated by the subsequent invocations of the first test including at least one file already associated with the first test in the test-to-file map. By limiting the number of reports utilized to modify the T2F map for a particular test, it may be possible to reduce the number of files that are inaccurately mapped to the particular test, especially where the average rate of files being inaccurately reported as covered is substantial.

Figure 6:
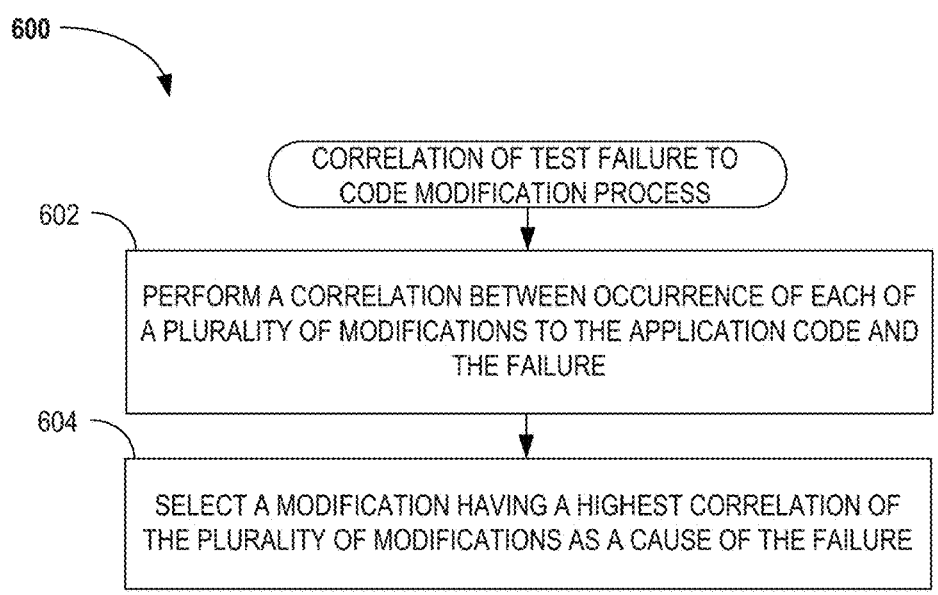
FIG. 6 is a flow diagram of a process of correlating test failures with code modifications, according to some examples.

FIG. 6 is a flow diagram 600 of a process of correlating test failures with code modifications, according to some examples. For example, test failure correlating engine 118 of system 110 shown in FIG. 1 may comprise appropriate instructions to carry out flow diagram 600. It should be understood that not all blocks of flow diagram 600 may be carried out and, in some examples, one or more actions not described in connection with flow diagram 600 may be carried out.

Flow diagram 600 begins with block 602, which includes performing a correlation between occurrence of each of a plurality of modifications to the application code and the failure. In some examples, test failure correlating engine 118 may carry out an algorithm that correlates the files or code sections modified by each of a plurality of modifications with the files determined to be covered by a failed test.

Flow diagram 600 advances to block 604, which includes selecting a modification having a highest correlation of the plurality of modifications as a cause of the failure. For example, test failure correlating engine 118 may select a modification having a highest correlation of the plurality of modifications as a cause of the failure. In other words, a modification to one or more files of the application under test that appear with the highest frequency as covered in the particular failed test should have the greatest probability of being the modification that caused the subsequent test failure. Thus, by identifying the most likely code modification or modifications, the developer who submitted (e.g., committed) that code modification may be identified as the source or cause of the test failure.

In some cases, testing application code can be a very calculation intensive process. Calculation load may increase where multiple tests are carried out in parallel, e.g., during time frames that at least partially overlap. Accordingly, it may be useful to predict which test or tests would be most likely to accurately verify continued quality and functionality of an application after submission (e.g., commitment) of a modification or addition to a particular file of the application.

FIG. 7 is a flow diagram 700 of a process of identifying a test for a submitted code modification, according to some examples. For example, test identification engine 116 of system 110 shown in FIG. 1 may include appropriate instructions to carry out flow diagram 700. It should be understood that not all blocks of flow diagram 700 may be carried out and, in some examples, one or more actions not described in connection with flow diagram 700 may be carried out.

Flow diagram 700 begins with block 702, which includes receiving an indication of a modification to a file of the application code. In some examples, test identification engine 116 may receive an indication of a modification to a file of the application code from either the database 150, from one of devices 140, 142, 144, or from one of the engines of system 110, for example, testing engine 112 or T2F mapping engine 114.

Flow diagram 700 advances to block 704, which includes performing a correlation between the file and covered files for each of a plurality of tests based on the T2F map. For example, test identification engine 116 may carry out an algorithm that correlates the modified file and files indicated as being covered by, e.g., associated with, each of a plurality of tests under consideration. In other words, where a particular file is modified, the test or tests having been previously mapped to the modified file are most likely to be able to verify continued quality and functionality of the application if run and passed.

Flow diagram 700 advances to block 706, which includes identifying at least one of the tests for subsequent invocation based on the correlation between the file and the at least one of the tests exceeding a threshold. For example, test identification engine 116 may identify at least one of the tests for subsequent invocation based on the correlation between the file and the at least one of the tests satisfying a threshold, e.g., the file being previously mapped to the file being modified, or the file being previously mapped to the file being modified and having an AF that satisfies the threshold. By identifying the test or tests previously mapped to the modified file, a more focused set of tests may be identified for subsequent testing, thereby potentially reducing the computational load required for proper quality assurance.

Figure 8:
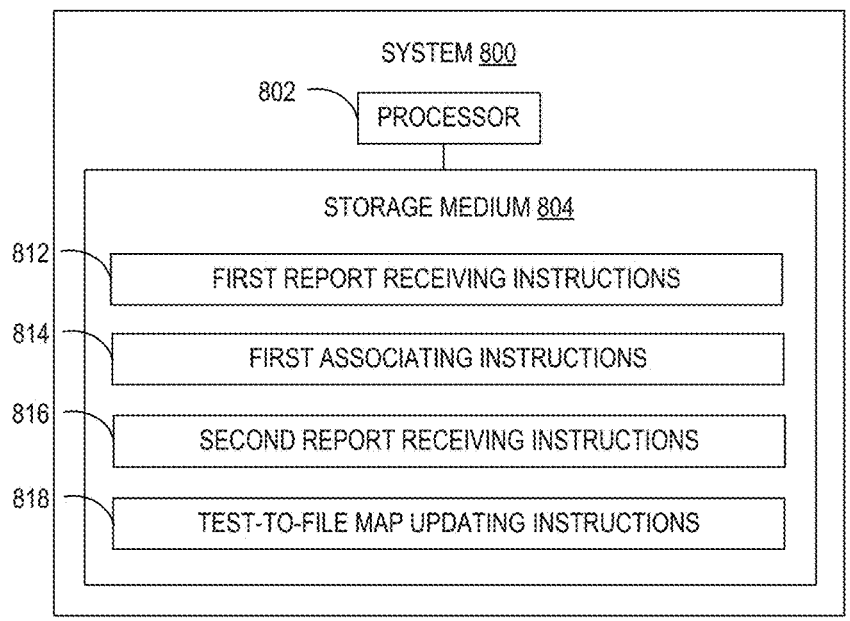
FIG. 8 is a block diagram of a system to analyze code coverage, according to some examples.

FIG. 8 is a block diagram of a system 800 that includes a processor (or multiple processors) 802. The system 800 further includes a non-transitory machine-readable or computer-readable storage medium 804 storing machine-readable instructions that are executable on the processor 802 to perform various tasks. Machine-readable instructions executable on a processor to perform a task can refer to machine-readable instructions executable on a single processor or on multiple processors to perform the task. A processor can include but is not limited to a microprocessor, a core of a multi-core microprocessor, a microcontroller, a programmable integrated circuit, a programmable gate array, or another hardware processing circuit. In some examples, system 800 may correspond to system 110 previously described in connection with FIG. 1.

The machine-readable instructions include first report receiving instructions 812 to receive, for a first invocation of a first test of a plurality of code coverage tests run at overlapping times, a first report indicating a first subset of files of application code covered by the first test, for example, as previously described in connection with FIG. 3.

The machine-readable instructions further include first associating instructions 814 to associate the first subset of files to the first test in a T2F map, for example, as previously described in connection with FIG. 3.

The machine-readable instructions further include second report receiving instructions 814 to receive a second report indicating a second subset of files of the application code covered by a second invocation of the first test, for example, as previously described in connection with FIG. 3.

The machine-readable instructions further include T2F map updating instructions 816 to associate the second subset of files to the first test in the T2F map, thereby updating the T2F map, for example, similar to that previously described in connection with FIG. 3.

In some examples, storage medium 804 may further include instructions for system 800 to perform any other action described in connection with any of FIGS. 1-7.

Figure 9:
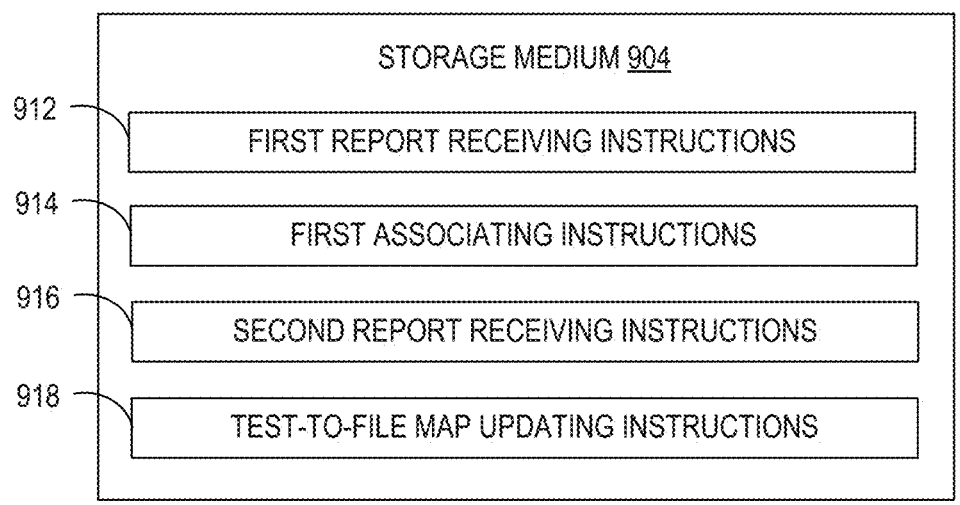
FIG. 9 is a block diagram of a storage medium storing machine-readable instructions for analyzing code coverage, according to some examples.

FIG. 9 is a block diagram of a non-transitory machine-readable or computer-readable storage medium 904 that stores machine-readable instructions executable by a system to perform various tasks. In some examples, storage medium 904 may correspond to storage medium 804 of system 800.

The machine-readable instructions include first report receiving instructions 902 to receive, for a first invocation of a first test of a plurality of code coverage tests run at overlapping times, a first report indicating a first subset of files of application code covered by the first test.

The machine-readable instructions further include first associating instructions 914 to associate the first subset of files to the first test in a T2F map.

The machine-readable instructions further include second report receiving instructions 916 to receive a second report indicating a second subset of files of the application code covered by a second invocation of the first test.

The machine-readable instructions further include T2F map updating instructions 918 to update the T2F map to associate the second subset of files to the first test in the T2F map.

In some examples, storage medium 904 may further include instructions to perform any other action described in connection with any of FIGS. 1-7.

The storage medium 804 or 904 can include but are not limited to any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, examples may be practiced without some of these details. Other examples may include modifications and variations from the details discussed above. It is intended that the appended claims cover such modifications and variations.

What is claimed is:

1. A method comprising:
   receiving, by a system comprising a processor, for a first invocation of a first test of a plurality of code coverage tests, a first report indicating a first subset of files of application code covered by the first test, wherein the first invocation of the first test overlaps in time with a second test of the plurality of code coverage tests other than the first test;
   generating, by the system, a test-to-file map associating the first subset of files to the first test;
   receiving, by the system, a second report indicating a second subset of files of the application code covered by a second invocation of the first test, wherein:
      the second invocation of the first test overlaps in time with a third test of the plurality of code invocation tests of the plurality of code coverage tests other than the first test, and
      at least one of the overlapping in time of the first invocation of the first test and the second test or the overlapping in time of the second invocation of the first test and the third test causes a given file of a set of files formed from the first subset of files and the second subset of files to be inaccurately indicated in at least one of the first report or the second report as being covered by the first test;
   processing, by the system, the set of files based on memberships of the files in the first and second reports to identify the given file, wherein processing the set of files comprises:
      for each respective file of the first subset of files, determining an affinity factor (AF); and
      generating, by the system, a report indicating files mapped by the test-to-file map for which the affinity factor (AF) satisfies a threshold; and
   based on the generated report, modifying, by the system, the test-to-file map.

2. The method of claim 1, wherein generating the test-to-file map comprises initializing, by the system, a respective hit counter for each file in the first subset of files.

3. The method of claim 2, wherein generating the test-to-foe map comprises incrementing, by the system, the respective hit counter for each file in the first subset of files.

4. The method of claim 1, wherein processing the set of files comprises incrementing, by the system, a respective hit counter for each file common to the first subset of files and the second subset of files.

5. The method of claim 1, wherein processing the set of files comprises initializing, by the system, a respective miss counter for each file in the first subset of files that is not also in the second subset of files.

6. The method of claim 5, wherein processing the set of files further comprises incrementing, by the system, the respective miss counter for each file in the first subset of files that is not also in the second subset of files.

7. The method of claim 1, wherein, for each respective file of the first subset of files, the affinity factor (AF) is based on a number of hits (H) for the respective file and a number of misses (M) for the respective file.

8. The method of claim 7, wherein the affinity factor is determined according to the formula: $AF=H/(H+M)$.

9. The method of claim 1, further comprising:
receiving, by the system, a plurality of reports indicating subsequent subsets of s of the application code covered by subsequent invocations of the first test; and
modifying, by the system, the test-to-file map to associate the subsequent subsets of files to the first test for a predetermined proportion of the subsequent invocations of the first test.

10. The method of claim 9, wherein the subsequent invocations of the first test included in the predetermined proportion are selected at random.

11. The method of claim 9, wherein the subsequent invocations of the first test included in the predetermined proportion are selected based on the subsequent subsets of files including at least one file already associated with the first test in the test-to-file map.

12. The method of claim 1 further comprising, based on a failure of at least one invocation of the first test:
performing a correlation between occurrences of each of a plurality of modifications to the application code and the failure; and
identifying a modification having a highest correlation of the plurality of modifications as a cause of the failure.

13. The method of claim 1, further comprising:
receiving an indication of a modification to a file of the application code;
performing a correlation between the file and covered files for each of a plurality of tests based on the test-to-file map; and
identifying at least one of the tests or subsequent invocation based on the correlation between the file and the at least one of the tests satisfying a threshold.

14. A system comprising:
a processor; and
a non-transitory storage medium storing instructions that are executable on the processor to:
receive, for a first invocation of a first test of a plurality of code coverage tests, a first report indicating a first subset of files of application code covered by the first test, wherein the first invocation of the first test overlaps in time with a second test of the plurality of code coverage tests other than the first test;
associate the first subset of files to the first test in a test-to-file map;
receive a second report indicating a second subset of files of the application code covered by a second invocation of the first test, wherein:
the second invocation of the first test overlaps in time with a third test of the plurality of code invocation tests of the plurality of code coverage tests other than the first test, and
at least one of the overlapping in time of the first invocation of the first test and the second test or the overlapping in time of the second invocation of the first test and the third test causes a given file of a set of files formed from the first subset of files and the second subset of files to be inaccurately indicated in at least one of the first report or the second report as being covered by the first test;
process the set of files based on memberships of the files in the first and second reports to identify the given file, wherein processing the set of files comprises:
for each respective file of the first subset of files, determining an affinity factor (AF); and
generating, by the system, a report indicating files mapped by the test-to-file map for which the affinity factor (AF) satisfies a threshold; and
update the test-to-file map based on the generated report.

15. The system of claim 14, wherein the instructions are further executable on the processor to generate the first report indicating the first subset of files of application code covered by the first test.

16. The system of claim 14, wherein the first subset of files comprises at least one file covered by the first test and at least one file covered by the second test.

17. A non-transitory machine-readable storage medium storing instructions that, upon execution, cause a system to:
receive, for a first invocation of a first test of a plurality of code coverage tests, a first report indicating a first subset of files of application code covered by the first test, wherein the first invocation of the first test overlaps in time with a second test of the plurality of code coverage tests other than the first test;
associate the first subset of files to the first test in a test-to-file map;
receive a second report indicating a second subset of files of the application code covered by a second invocation of the first test, wherein:
the second invocation of the first test overlaps in time with a third test of the plurality of code invocation tests of the plurality of code coverage tests other than the first test, and
at least one of the overlapping in time of the first invocation of the first test and the second test or the overlapping in time of the second invocation of the first test and the third test causes a given file of a set of files formed from the first subset of files and the second subset of files to be inaccurately indicated in at least one of the first report or the second report as being covered by the first test;
process the set of files based on memberships of the files in the first and second reports to identify the given file, wherein processing the set of files comprises:
for each respective file of the first subset of files, determining an affinity factor (AF); and
generating, by the system, a report indicating files mapped by the test-to-file map for which the affinity factor (AF) satisfies a threshold; and
update the test-to-file map based on the generated report.

18. The non-transitory machine-readable storage medium of claim 17, wherein calculating the affinity factor (AF) for each file comprises calculating $H/(H+M)$, wherein H represents a number of hits for the file and M represents a number of misses for the file.

* * * * *